(12) United States Patent
Katakura et al.

(10) Patent No.: US 6,763,295 B2
(45) Date of Patent: Jul. 13, 2004

(54) DRIVING FORCE CONTROL APPARATUS AND METHOD FOR AUTOMOTIVE VEHICLE

(75) Inventors: Shusaku Katakura, Kanagawa (JP); Mikio Nozaki, Kanagawa (JP); Daisuke Yoshinoya, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 1 day.

(21) Appl. No.: 10/345,256

(22) Filed: Jan. 16, 2003

(65) Prior Publication Data

US 2003/0158647 A1 Aug. 21, 2003

(30) Foreign Application Priority Data

Feb. 18, 2002 (JP) ........................................ 2002-039456

(51) Int. Cl.[7] .............................................. G06F 19/00
(52) U.S. Cl. .............................. 701/70; 701/84; 701/85
(58) Field of Search ............................. 701/70, 84, 85, 701/90; 180/233; 303/140, 146

(56) References Cited

U.S. PATENT DOCUMENTS 5,832,400 A * 11/1998 Takahashi et al. ............ 701/53
5,911,206 A * 6/1999 Bylsma ....................... 123/295
6,148,257 A 11/2000 Katakura et al.

FOREIGN PATENT DOCUMENTS

JP 11-78620 A 3/1999

* cited by examiner

Primary Examiner—Marthe Y. Marc-Coleman
(74) Attorney, Agent, or Firm—Foley & Lardner LLP

(57) ABSTRACT

In apparatus and method for controlling a driving force for an automotive vehicle, a manipulated variable of an accelerator is detected, a vehicular velocity is detected, a vehicular velocity control purpose target driving force is calculated from an absolute value of the manipulated variable of the accelerator and the vehicular velocity, an acceleration control purpose target driving force is calculated from either at least one of an absolute value of the accelerator manipulated variable and a variation velocity of the manipulated variable of the accelerator or from at least one of an absolute value of a result of calculation of the vehicular velocity control purpose target driving force and a variation velocity of the result of calculation of the same, and both of the vehicular velocity control purpose target driving force and the acceleration control purpose target driving force are synthesized to achieve a target driving force of the vehicle.

31 Claims, 12 Drawing Sheets

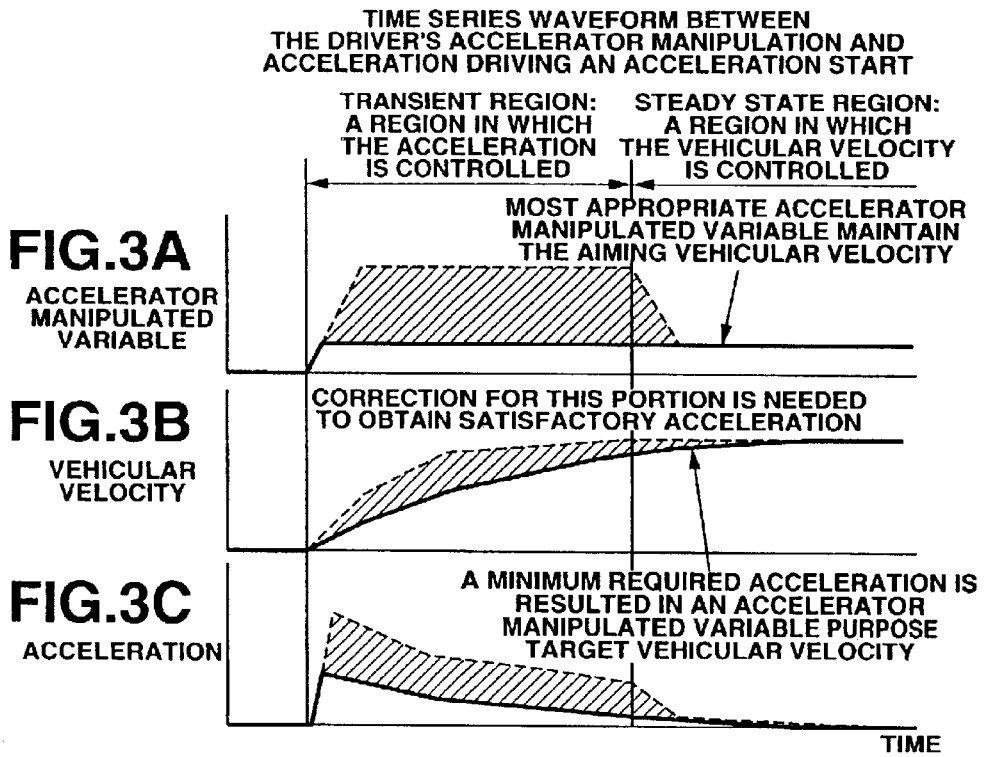
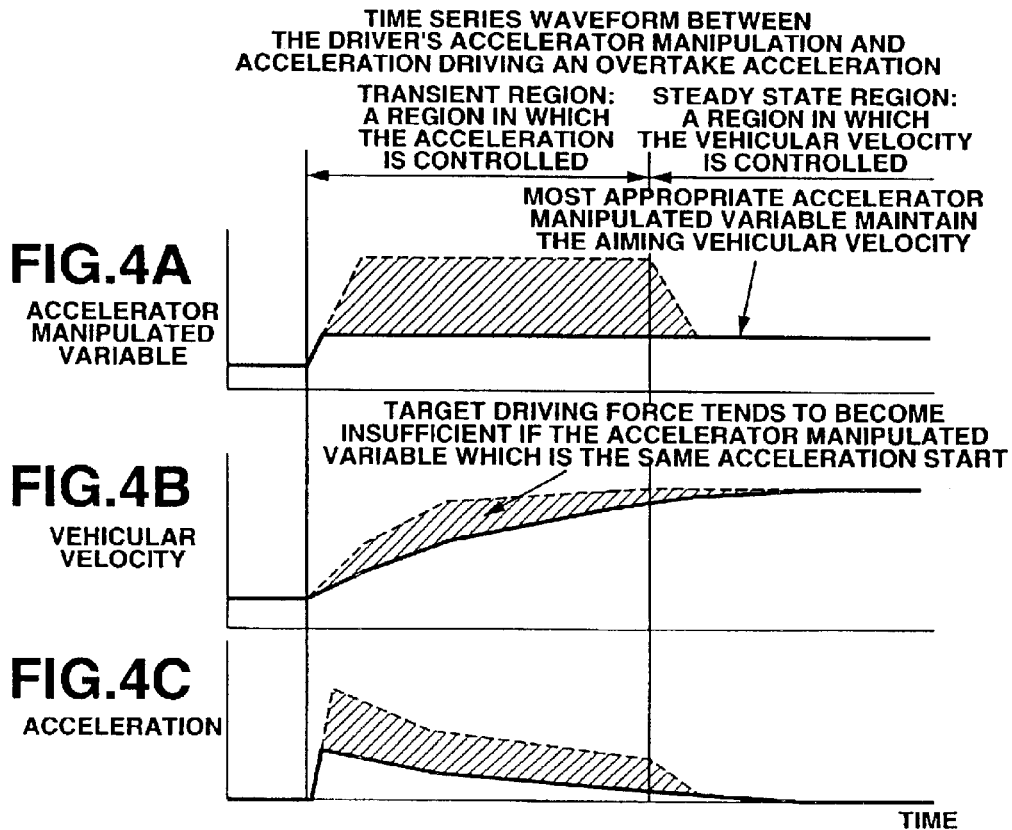

CORRECTION DURING ACCELERATION START

TRANSIENT REGION: A REGION IN WHICH THE ACCELERATION IS CONTROLLED

STEADY STATE REGION: A REGION IN WHICH THE VEHICULAR VELOCITY IS CONTROLLED

FIG.5A ACCELERATOR MANIPULATED VARIABLE

CORRECTION QUANTITY IN ACCORDANCE WITH ACCELERATOR MANIPULATED VARIABLE

FIG.5B TARGET DRIVING FORCE a SECTION b SECTION

TARGET DRIVING FORCE IS NOT IMMEDIATELY DECREASED BUT IS MAINTAINED

STEADY STATE PURPOSE TARGET DRIVING FORCE

FIG.5C ACCELERATION

TRANSIENT STATE PURPOSE CORRECTION QUANTITY

TIME

CORRECTION DURING OVERTAKE ACCELERATION

TRANSIENT REGION: A REGION IN WHICH THE ACCELERATION IS CONTROLLED

STEADY STATE REGION: A REGION IN WHICH THE VEHICULAR VELOCITY IS CONTROLLED

FIG.6A ACCELERATOR MANIPULATED VARIABLE

CORRECTION QUANTITY IN ACCORDANCE WITH ACCELERATOR MANIPULATED VARIABLE

FIG.6B TARGET DRIVING FORCE

TRANSIENT STATE PURPOSE CORRECTION QUANTITY

ACCORDING TO THE CORRECTION, NECESSARY AND SUFFICIENT TARGET DRIVING FORCE IS DEVELOPED a SECTION b SECTION

STEADY STATE PURPOSE TARGET DRIVING FORCE

FIG.6C ACCELERATION

TARGET DRIVING FORCE OBTAINED BY A PREVIOUSLY PROPOSED METHOD

TIME

DRIVING FORCE CONTROL APPARATUS AND METHOD FOR AUTOMOTIVE VEHICLE

BACKGROUND OF THE INVENTION

1. Field of the Invention

The present invention relates to driving force control apparatus and method for an automotive vehicle in which a vehicular target driving force which is in accordance with a vehicle driver's demand is derived and the derived target driving force is realized by controlling an actual driving force in a vehicular drive system from an engine to driven wheels.

2. Description of the Related Art

A Japanese Patent Application First Publication No. Heisei 11-78620 published on Mar. 23, 1999 (which corresponds to a U.S. Pat. No. 6,148,257 issued on Nov. 14, 2000) exemplifies a previously proposed driving force control apparatus. In the above-described Japanese Patent Application First Publication, such a technique that a target driving force is derived according to a map retrieval based on an accelerator manipulated variable and a vehicular velocity.

SUMMARY OF THE INVENTION

However, as will be described later, in the above-described vehicular driving force control apparatus disclosed in the Japanese Patent Application First Publication Heisei 11-78620, it is impossible to establish a compatibility between a vehicular acceleration performance from a standstill and overtake acceleration performance.

First, suppose a relationship between an accelerator manipulation method of a vehicle driver (in other words, a model pattern in which the vehicle driver depresses an accelerator pedal during an acceleration start of the vehicle) and the target driving force. In an acceleration scene (when the driver has decided that the vehicle should be accelerated), the driver manipulates the accelerator depression (depresses deeply the accelerator pedal), and, thereafter, maintains a position of accelerator pedal so that an accelerator manipulation variable is constant. Then, when the vehicular velocity reaches to a certain value, the driver satisfies the acceleration and carries out an accelerator pedal release operation (to zero the manipulated variable of the accelerator). A locus of the target driving force in this acceleration scene is such that the target driving force is once increased substantially vertically in response to the first accelerator pedal deep depression. Then, when the subsequent accelerator manipulated variable is maintained constant, the target driving force is gradually decreased along with an increase in a vehicular velocity due to the acceleration. Thereafter, an accelerator return (or accelerator pedal release) operation is carried out so that a vehicular state is converged into a vicinity to a certain vehicular velocity.

Next, suppose that the overtake acceleration is carried out with accelerator manipulated variable equal to the acceleration start described above. In this case, since the target driving force characteristic is prepared so as to be converged to a certain vehicle velocity, an extra accelerator manipulated variable is less, the vehicle state is resulted in the convergence into a certain vehicular velocity without accelerator return (accelerator pedal release) operation.

In this case, it cannot be thought that a sufficient degree of acceleration is carried out, with a fact that the driver generally depresses more deeply the accelerator pedal than usual and, thereafter, carries out the return operation for the accelerator pedal during the vehicular acceleration taken into consideration. To obtain the sufficient overtake acceleration, the driver depresses the accelerator pedal more deeply than the case of the acceleration start (the accelerator manipulated variable is increased). Then, an additional driving force is added to the target driving force and an accelerator feeling becomes satisfactory.

However, to achieve this addition of the target driving force, the target driving force characteristic with respect to accelerator manipulated variable is not present so as to substantially be translate to an adjacent target driving force line the cannot be prepared due to an overshooting feeling during the acceleration start. Because it is necessary to create the target driving force characteristic with respect to the accelerator manipulated variable in such a way that the target driving force characteristic converges into a driving force corresponding to a running resistance at a certain vehicular velocity.

If not so, the target driving force characteristic would not be competed with the running resistance and a vehicular characteristic is indicated such that the acceleration is increased continuously without stop for a long period of tine if the return manipulation of the accelerator is carried out. Hence, a control easiness to maintain the vehicular velocity and a cruise-speed running characteristic are worsened. In addition, in terms of the acceleration feeling, the driver expects that the vehicle acceleration becomes soon settled. Hence, such an evaluation is not always carried out that the acceleration feeling is preferable.

To solve the above-described inconsistency, such many discussion as, in an overtake acceleration region, the cruise speed running state and the acceleration state are divided according to a detection of the vehicle driver's acceleration demand and an appropriate driving force characteristic is given to the divided cruise run state and acceleration state have been made. In this method, it is necessary to grasp strictly the vehicle driver's acceleration demand. However, this is very difficult. With a risk considered when an erroneous determination is made, a sufficient correction cannot be made. Hence, if possible, it is desirable to provide no system in which a switching occurs in response to some trigger.

A plurality of proposals have been made in which the same driving force control is achieved through a gear shift diagram control of a transmission. However, many problems are provided in points listed below to perform the conformity to the acceleration feeling. 1) With a multiple-ratio geared transmission as a prerequisite, a driving force step difference is always present as a result of control and a smoothness becomes sacrificed. 2) Even if a continuously variable transmission is used, a revolution change is always necessary. In a case where the acceleration is not varied for the variation in revolution, it is difficult to make conformity when the acceleration feeling is spoiled. 3) For example, a method of control cannot help being largely varied according to a mechanism such as the multiple-ratio geared transmission and a continuously variable transmission. In addition, it is difficult to apply the driving force control to a manual transmission mounted vehicle, an electric vehicle or hybrid vehicle.

It is, hence, an object of the present invention to provide driving force controlling apparatus and method for an automotive vehicle which can achieve compatibility between a large acceleration demand immediately after the acceleration start from the standstill and a vehicular velocity controllability in the vicinity to the target vehicular velocity after the target acceleration from the standstill and a vehicular velocity after the end of acceleration end and can achieve the compatibility between the large acceleration demand immediately after the overtake start at a time of the overtake acceleration and vehicular velocity controllability in the vicinity to the end of acceleration.

The above-described object can be achieved by providing an apparatus for controlling a driving force for an automotive vehicle, comprising: an accelerator manipulated variable detecting section that detects a manipulated variable of an accelerator; a vehicular velocity detecting section that detects a vehicular velocity; and a target driving force calculating section that derives a vehicular target driving force in accordance with a vehicle driver's demand, the apparatus achieving the derived target driving force and the target driving force calculating section comprising: a vehicular velocity control purpose target driving force calculating section that calculates a vehicular velocity control purpose target driving force from an absolute value of the manipulated variable of the accelerator and the vehicular velocity; an acceleration control purpose target driving force calculating section that generates an acceleration control purpose target driving force from at least one of an absolute value of the accelerator manipulated variable and a variation speed of the manipulated variable of the accelerator; and a target driving force synthesizing section that synthesizes both of the vehicular velocity control purpose target driving force and the acceleration control purpose target driving force.

The above-described object can also be achieved by providing an apparatus for controlling a driving force for an automotive vehicle, comprising: an accelerator manipulated variable detecting section that detects a manipulated variable of an accelerator; a vehicular velocity detecting section that detects a vehicular velocity; and a target driving force calculating section that derives a vehicular target driving force in accordance with a vehicle driver's demand, the apparatus achieving the derived target driving force and the target driving force calculating section comprising: a vehicular velocity control purpose target driving force calculating section that calculates a vehicular velocity control purpose target driving force from an absolute value of the manipulated variable of the accelerator and the vehicular velocity; an acceleration control purpose target driving force calculating section that generates an acceleration control purpose target driving force from at least one of an absolute value of a result of calculation by the vehicular velocity control purpose target driving force calculating section and a variation speed of the result of calculation by the same; and a target driving force synthesizing section that synthesizes both of the vehicular velocity control purpose target driving force and the acceleration control purpose target driving force.

The above-described object can also be achieved by providing a method for controlling a driving force for an automotive vehicle, the method comprising: detecting a manipulated variable of an accelerator; detecting a vehicular velocity; and deriving a vehicular target driving force in accordance with a vehicle driver's demand, the method achieving the derived target driving force and driving the vehicular target driving force comprising: calculating a vehicular velocity control purpose target driving force from an absolute value of the manipulated variable of the accelerator and the vehicular velocity; generating an acceleration control purpose target driving force from at least one of an absolute value of the accelerator manipulated variable and a variation velocity of the manipulated variable of the accelerator; and synthesizing both of the vehicular velocity control purpose target driving force and the acceleration control purpose target driving force to achieve a target driving force of the vehicle.

The above-described object can also be achieved by providing a method for controlling a driving force for an automotive vehicle, the method comprising: detecting a manipulated variable of an accelerator; detecting a vehicular velocity; and deriving a vehicular target driving force in accordance with a vehicle driver's demand, the method achieving the derived target driving force and deriving the target driving force comprising: calculating a vehicular velocity control purpose target driving force from an absolute value of the manipulated variable of the accelerator and the vehicular velocity; generating an acceleration control purpose target driving force from at least one of an absolute value of a result of calculation of the vehicular velocity control purpose target driving force and a variation velocity of the result of calculation of the same; and synthesizing both of the vehicular velocity control purpose target driving force and the acceleration control purpose target driving force.

This summary of the invention does not necessarily describe all necessary features so that the invention may also be a sub-combination of these described features.

BRIEF DESCRIPTION OF THE DRAWINGS

FIGS. 3A, 3B, and 3C show time series waveform charts of an accelerator manipulated variable by a vehicle driver's manipulation on an accelerator (pedal), a vehicular velocity along therewith, and an acceleration along therewith during an acceleration start from a vehicle standstill.

FIGS. 4A, 4B, and 4C show time series waveform charts of the accelerator manipulated variable by the vehicle driver's manipulation on the accelerator pedal by the vehicle driver, the vehicular velocity along therewith, and the acceleration along therewith during an overtake acceleration to overtake another vehicle.

FIGS. 5A, 5B, and 5C show time series waveform charts of a driving force correction during the acceleration start in the driving force controlling apparatus in each of the first and second preferred embodiments according to the present invention.

FIGS. 6A, 6B, and 6C show time series waveform charts of the driving force correction during the overtake acceleration in the driving force controlling apparatus in each of the first and second preferred embodiments according to the present invention.

DETAILED DESCRIPTION OF THE PREFERRED EMBODIMENTS

Reference will hereinafter be made to the drawings in order to facilitate a better understanding of the present invention.

(First Embodiment and Second Embodiment)

FIGS. 1, 2, 3A, 3B, 3C, 4A, 4B, 4C, 5A, 5B, 5C, 6A, 6B, and 6C show vehicular driving force controlling apparatuses in first and second preferred embodiments according to the present invention, respectively.

Figure 1:
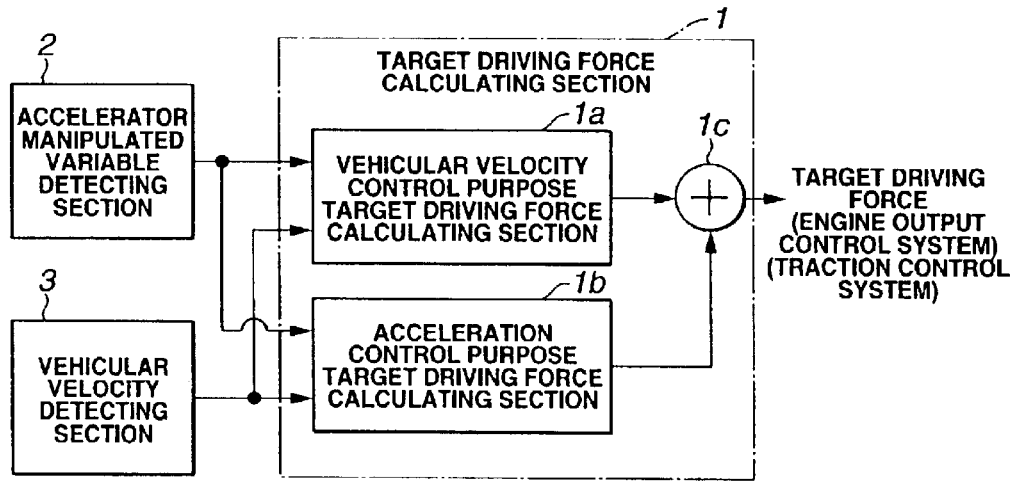
FIG. 1 is a circuit block diagram of an inventive concept of a vehicular driving force controlling apparatus in a first preferred embodiment according to the present invention.
Figure 2:
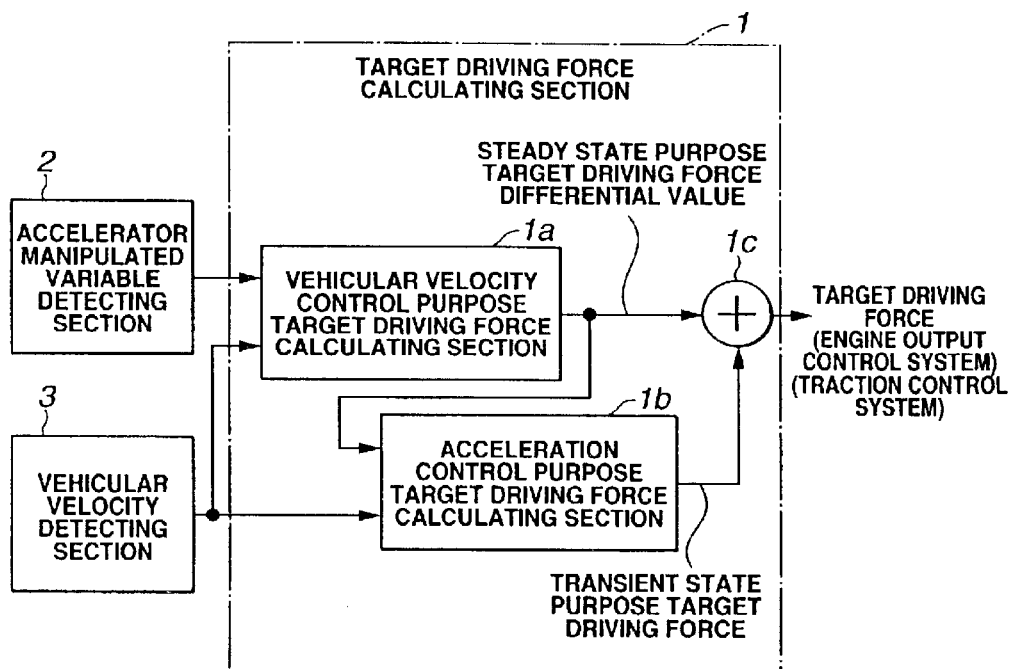
FIG. 2 is a circuit block diagram of another inventive concept of the vehicular driving force controlling apparatus in a second preferred embodiment according to the present invention.

The driving force controlling apparatus in each of the first and second preferred embodiments according to the present invention, as shown in conceptual views of FIGS. 1 and 2, includes: a target driving force calculating section 1 which derives a vehicular target driving force in accordance with a vehicle driver's demand so that the derived target driving force is achieved; an accelerator manipulated variable detecting section 2 that detects an accelerator manipulated variable; and a vehicular velocity detecting section 3 that detects a vehicular velocity. Target driving force calculating section 1 is divided into a vehicular velocity control purpose target driving force calculating section 1a which generates a vehicular velocity control purpose target driving force to control the vehicular velocity in a steady state and an acceleration control purpose target driving force to control the vehicular velocity in a steady state and an acceleration control purpose target driving force calculating section 1b which generates an acceleration control purpose target driving force to control the acceleration in a transient state. A target driving force synthesis section 1c synthesizes both of the vehicular velocity control purpose target driving force and acceleration control purpose target driving force to derive a final target driving force. It is noted that the driving force control includes a driving source output control of a driving source such as an engine or electric motor, a transmission gear ratio control of a transmission associated with the driving source, and a combination of the driving source output control and transmission gear ratio control. These control the driving force to be inputted to driven road wheels. Target driving force calculating section 1 is, for example, incorporated as a target driving force calculating program into an engine output control system constituted by an in-vehicle microcomputer or as the target driving force calculating program incorporated into a vehicular traction control system.

Accelerator manipulated variable detecting section 2 is used as an accelerator manipulated variable sensor to detect a manipulated variable of an accelerator pedal. Vehicular velocity detecting section 3 specifically includes a transmission output axle rotation sensor or road wheel velocity sensors.

Vehicular velocity control purpose target driving force calculating section 1a generates the vehicular velocity purpose target driving force (=steady state purpose target driving force) according to the accelerator manipulated variable-convergence vehicular velocity characteristic determined from a running resistance in the cruise running state determined mainly in relation to the vehicular velocity on the basis of an absolute value of the accelerator manipulated variable and vehicular velocity in the same way as the previously proposed target driving force generation described in the BACKGROUND OF THE INVENTION.

Since the vehicular velocity control purpose target driving force calculating section 1a generates a static value with the steady state as a prerequisite, a dynamic calculation element is not needed.

Acceleration control purpose target driving force calculating section 1b generates the acceleration control purpose target driving force (=transient state purpose target driving force) to raise a steady state purpose target driving force determined by vehicular velocity control purpose target driving force calculating section 1a. Specifically, the following construction may be considered to constitute the acceleration control purpose target driving force. (1) Acceleration control purpose target driving force calculating section 1b generates the acceleration control purpose target driving force from an absolute value of the accelerator manipulated variable, a variation velocity of the accelerator manipulated variable, and vehicular velocity (refer to FIG. 1). (2) Acceleration control purpose target driving force calculating section 1a generates the acceleration control purpose target driving force from an absolute value of a calculation result by vehicular velocity control purpose target driving force calculating section 1a, a variation velocity of the calculation result by vehicular velocity control purpose target driving force calculating section 1a, and the vehicular velocity (refer to FIG. 2). This acceleration control purpose driving force calculating section 1b generates the acceleration control purpose target driving force (hereinafter, refer also to the transient state purpose target driving force) in connection with the vehicular velocity before the acceleration and which are proportional to an absolute value of the driver's accelerator manipulated variable and a accelerator manipulation speed. Specifically, the following cases (1) to (3) needs to be carried out according to the necessity, (1) At the same time when the accelerator pedal depression occurs, the calculation of the transient state purpose target driving force is started and the transient state target driving force which is proportional to the accelerator depression (manipulation) velocity is derived. (2) After the acceleration depression manipulation is ended, even if no accelerator return manipulation is present, the transient state purpose target driving force is slowly converged into zero together with a lapse of time. (3) After the accelerator (pedal) return manipulation is carried out, the instantaneous transient state purpose target driving force is progressively reduced to zero.

For example, the transient state purpose target driving force satisfying above-described conditions (1) to (3) is derived according to a characteristic equation given by the differential value of the target driving force, a gain in accordance with the differential value, a hold value of a past target driving force, and a gain in accordance with the hold value.

Next, an operation in the case of each of the first and second embodiments of the vehicular driving force controlling apparatus will be described below with reference to FIGS. 3A through 4C.

A relationship between the acceleration manipulation by the vehicle driver and the acceleration is viewed in terms of a time series as shown in FIGS. 3A through 4C.

First, it is general practice that when the driver carries out a slightly deeper acceleration pedal depression at an initial stage of acceleration and returns the accelerator pedal position toward its original release position when the vehicular velocity becomes a velocity placed in the vicinity to a certain value, as shown in FIGS. 3A through 3C. This is because the driver has obscure mind in a relationship between the manipulated variable of the accelerator (pedal) and a certain vehicular velocity into which the vehicular velocity is finally converged according to the manipulated variable and if the vehicle is accelerated by the accelerator manipulated variable which corresponds to a target value with respect to the vehicular velocity, the acceleration feeling becomes insufficient at the initial stage of acceleration so that a more or less deeper acceleration pedal depression is carried out.

That is to say, it may be considered that, at the initial stage of acceleration, the vehicle driver carries out a control to the acceleration. In the same way, the reason that the accelerator return manipulation in the vicinity to the certain vehicular velocity is that it may be considered that the vehicular velocity to the target vehicular velocity is kept in mind of the driver obscurely and, when the vehicular velocity reaches to the vehicular velocity to be the target vehicular velocity, an object to be controlled is switched to the vehicular velocity. That is to say, it may be considered that, at the initial stage of acceleration, the vehicle driver carries out a control to the acceleration. In the same way, the reason that the accelerator return manipulation in the vicinity to a certain vehicular velocity is that it may be considered that the vehicular velocity to be the target is kept in mind of the driver obscurely and, when the vehicular velocity reaches to the vehicular velocity to be the target vehicular velocity, an object to be controlled is switched to the vehicular velocity. That is to say, it may be considered that at the final stage of acceleration and, after the acceleration is ended, the control to the vehicular velocity is carried out.

The tendency described above does not change even if an overtake acceleration is carried out as shown in FIGS. 4A through 4C. That is to say, before the overtake acceleration is carried out, the accelerator manipulation to maintain the certain vehicular velocity is carried out. However, when the acceleration is controlled in such a way that deeper depression (large manipulated variable) of the accelerator pedal than that corresponding to the vehicular velocity. Then, when the vehicular velocity is increased and is placed in the vicinity to the certain vehicular velocity, the accelerator (pedal) return operation is carried out, the control to maintain the vehicular velocity and the cruise speed control are carried out in the usual manner.

On the other hand, in each of the first and second embodiments, target driving force calculating section 1 is divided into: vehicular velocity control purpose target driving force calculating section 1a which generates the steady state purpose target driving force to control a vehicular velocity in the steady state; and acceleration control purpose target driving force calculating section 1b which generates transient state purpose target driving force to control the acceleration in the transient state. Target driving force synthesizing section 1c synthesizes both of the steady state purpose target driving force and the transient state purpose target driving force to derive a final target driving force. Hence, during the acceleration, a correction (the correction to raise the driving force) such that the driver's accelerator manipulated variable is reduced only in a region at an initial stage of the accelerator control can be carried out. During the steady state, a cruise speed controllability is not sacrificed due to the generation of vehicular velocity control purpose target driving force. In addition, in the acceleration state, a sufficient acceleration can be achieved without a large acceleration manipulated variable more than necessary irrespective of the start acceleration or the overtake acceleration due to the generation of the acceleration control purpose target driving force.

Next, advantages of each of the first and second embodiments of the vehicular driving controlling apparatus will be described below.

(1) Target driving force calculating section 1 is divided into vehicular velocity control purpose target driving force calculating section 1a and acceleration control purpose target driving force calculating section 1b. In a case where the driver's acceleration demand is strong, a raise of the target driving force is carried out with the transient state purpose target driving force which corresponds to the acceleration demand reflected on the steady state purpose target driving force by means of vehicular velocity control purpose target driving force calculating section 1a, a compatibility between the large acceleration demand immediately after the start of the vehicle at the acceleration start and the vehicular velocity controllability in the vicinity to the target vehicular velocity after the end of acceleration can be achieved. In addition, the compatibility between the large acceleration immediately after the start at the overtake acceleration and the vehicular velocity controllability in the vicinity to the target vehicular velocity after the acceleration start can be achieved.

(2) Acceleration control purpose target driving force calculating section 1b starts the transient state purpose target driving force at the same time when the accelerator pedal depression manipulation is started and derives the transient state purpose target driving force proportioned to a driver's acceleration depression velocity. Hence, in spite of the fact that the acceleration demand occurs at the time of the acceleration start or at the time of the overtake acceleration, the acceleration performance in accordance with the acceleration demand of the driver represented in the acceleration depression manipulation velocity a rate of the driver's accelerator pedal depression to time) can be obtained.

(3) Since the acceleration control purpose target driving force calculating section 1b causes the transient state purpose target driving force to be slowly converged into zero together with a lapse in time even if no accelerator return manipulation is present after the accelerator depression manipulation is ended (hatched portions, viz., a sections in FIGS. 5B and 6B), the sufficient acceleration performance can be obtained without the large accelerator pedal depression manipulation more than necessary irrespective of whether it is the time of the start of acceleration or whether the overtake acceleration occurs. In other words, since the sufficient acceleration performance can be obtained at a required minimal accelerator manipulation, the acceleration feeling received from the driver is increased.

(4) Since acceleration control purpose target driving force calculating section 1b causes the instantaneous transient state purpose target driving force to be gradually reduced to zero (b sections in FIGS. 5B and 6B) when the accelerator return (release) manipulation is carried out, according to the accelerator return (release) manipulation, it is determined that a will of the driver to accelerate the vehicle becomes null and the target driving force is converged only into the steady state purpose target driving force. While suppressing the influence of an abrupt change in the driving force to a small value, a high vehicular velocity controllability in the vicinity to the target vehicular velocity after the end of acceleration can be achieved.

In the first and second embodiments, acceleration control purpose target driving force calculating section 1b ① that generates the acceleration control purpose target driving force from an absolute value of the accelerator manipulated variable, a variation velocity of the accelerator manipulated variable, and the vehicular velocity (refer to FIG. 1) ② that generates the acceleration control purpose target driving force from an absolute value of a calculation result by means of the vehicular velocity control purpose target driving force calculating section 1a, a variation velocity of the calculation result, and the vehicular velocity (refer to FIG. 2). Acceleration control purpose target driving force calculating section 1b constituted by either item ① or ② has the common action and advantages as described in the first and second embodiments. Item ② carries out a correction for the target driving force which provides a direct cause to determine a power performance. Item ① carries out the correction for the accelerator manipulated variable. Item ① carries out the correction for the accelerator manipulated variable. Item ② is more direct than the item ①. Since item ② is not dependent on an allocation characteristic to the accelerator manipulated variable-to-target driving force. Item ② is more suitable than item ①. In details, if the acceleration control purpose target driving force calculating section 1b is constituted by item ②, a simple conversion permits the equivalent control to be realized. Hence, the following describes preferred embodiments related to acceleration control purpose target driving force calculating section 1b.

(Third Embodiment)

Figure 7:
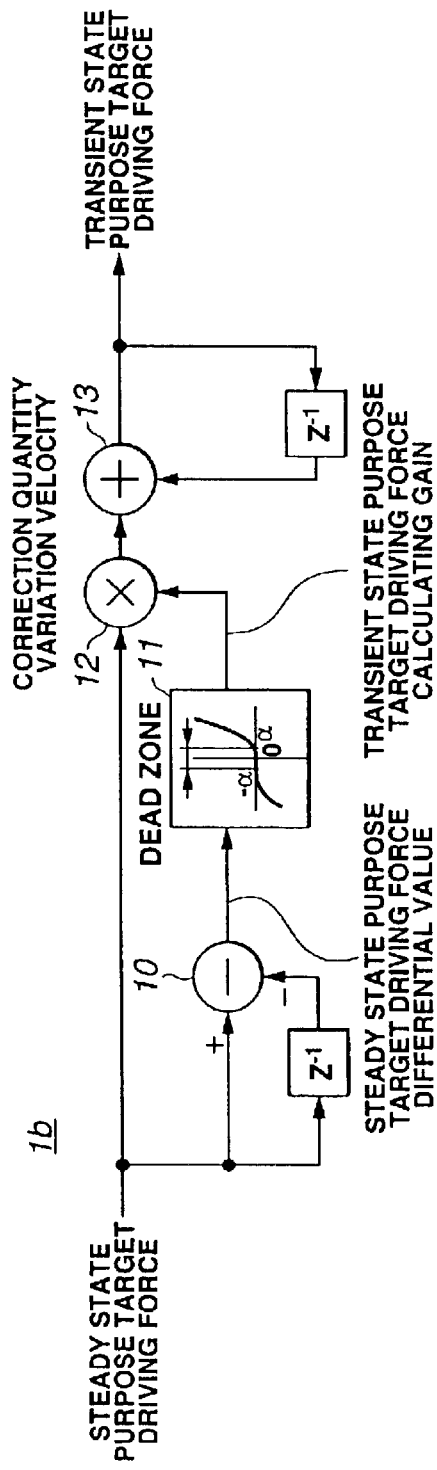
FIG. 7 is a block diagram representing an acceleration control purpose target driving force calculating section of the vehicular driving force controlling apparatus in a third preferred embodiment according to the present invention.

FIG. 7 shows acceleration control purpose target driving force calculating section 1b of the vehicular driving force controlling apparatus in a third preferred embodiment according to the present invention.

Acceleration control purpose target driving force calculating section 1b in the third embodiment includes: a differentiator 10 which calculates a steady state purpose target driving force differential value on the basis of the steady state purpose target driving force from vehicular velocity control purpose target driving force calculating section 1a; a gain setter 11 that sets a transient state purpose driving force calculating gain on the basis of the steady state purpose target driving force differential value; a multiplier 12 which multiplies the steady state target driving force and the transient state purpose target driving force calculating gain to derive a variation velocity of the correction quantity; and an adder 13 which adds or subtracts the correction quantity per calculation period according to the correction quantity variation velocity to or from the previous transient state purpose target driving force to calculate the present transient state purpose target driving force. Gain setter 11 sets the gain with a range from a set value of $-\alpha$ and $+\alpha$ being a dead zone, according to a non-linear characteristic in a region of the steady state purpose target driving force differential value exceeding $+\alpha$ and below $-\alpha$. Hence, acceleration control purpose target driving force calculating section 1b has the following advantage.

Hence, according to acceleration control purpose target driving force calculating section 1b in this embodiment, the following advantages can be obtained.

(1) Since acceleration control purpose target driving force calculating section 1b develops the transient state purpose target driving force which is the acceleration control purpose target driving force according to the differential value (variation velocity) of the steady state purpose target driving force from vehicular velocity control purpose target driving force calculating section 1a, the transient state purpose target driving force represented in accelerator pedal depression velocity on which an acceleration will of the driver is reflected can be obtained.

(2) Acceleration control purpose target driving force calculating section 1b derives the differential value of the steady state purpose target driving force from vehicular velocity control purpose target driving force calculating section 1a, sets the transient state purpose target driving force calculating gain corresponding to the differential value of the steady state target driving force from vehicular velocity control purpose target driving force calculating section 1a, sets the transient state target driving force calculating gain corresponding to the differential value, calculates the correction quantity variation velocity according to this gain and steady state purpose target driving force, and calculates the present transient state purpose target driving force by adding the correction quantity according to the correction quantity variation velocity per calculation period to the previous transient state target driving force to calculate the present transient state purpose target driving force. Hence, since the transient state purpose target driving force calculating gain provides the non-linear characteristic for the steady state target driving force differential value, the large transient state target driving force is obtained as the accelerator depression velocity becomes fast. Consequently, a strong acceleration will of the driver can be reflected on the target driving force.

(3) Since acceleration control purpose target driving force calculating section 1b maintains the transient state purpose target driving force at a time point at which the accelerator depression manipulation is determined to the ended after such an accelerator depression manipulation that the differential value of the steady state purpose target driving force indicates a value placed in the vicinity to zero, a high acceleration performance can be obtained while suppressing the accelerator manipulated variable to a small value.

(4) Since acceleration control purpose target driving force calculating section 1b derives the differential value of the steady state purpose target driving force from vehicular velocity control purpose target driving force calculating section 1a and sets the transient state purpose target driving force calculating gain to zero when the differential value falls within the range equal to or below the set value. Since the previous transient state purpose target driving force provides directly to the present transient state purpose target driving force, a simple technique such as the set of the transient state can maintain the transient target driving force at a time point where the accelerator depression manipulation end is determined after the accelerator depression manipulation is ended.

(5) Since the acceleration control purpose target driving force calculating section 1b subtracts the transient state purpose target driving force which is the acceleration control purpose target driving force in accordance with a decrease in the driver's acceleration demand, the target driving force is gradually converged to only that according to the steady state purpose target driving force. Thus, a high vehicular velocity controllability can be obtained in the vicinity to the target vehicle velocity after the acceleration is ended.

(6) Since acceleration control purpose target driving force calculating section 1b determines the differential value of the steady state purpose target driving force from vehicular velocity control purpose calculating section 1a, sets the transient state purpose target driving force calculating gain corresponding to this differential value including a negative value, calculates the correction quantity variation velocity from this gain and steady state purpose target driving force, and subtracts the correction quantity per calculation period due to the correction quantity variation velocity from the previous transient state purpose target driving force so as to calculate the present transient state purpose target driving force. Hence, the simple technique such that the transient state purpose target driving force calculating gain including a negative value permits the subtraction of the transient state purpose target driving force in accordance with the decrease in the acceleration demand by the driver.

(7) Since acceleration control purpose target driving force calculating section 1b does not calculate the transient state target driving force with respect to a minute accelerator depression manipulation by the driver, the start of acceleration control in which the target driving force is increased even if the minute acceleration manipulation by the driver having no acceleration intension can be prevented from being started.

(8) Since acceleration control purpose target driving force calculating section 1b derives the differential value of the steady state target driving force from vehicular velocity control purpose target driving force calculating section 1a, with a range equal to or less than values at which this differential value is set as a dead zone, does not calculate the transient state purpose target driving force when the transient state purpose target driving force differential value is set within this dead zone. Hence, a simple technique such that the dead zone is set for the steady state target driving force differential value inhibits the minute accelerator manipulation of the driver from being calculated.

(Fourth Embodiment)

Figure 8:
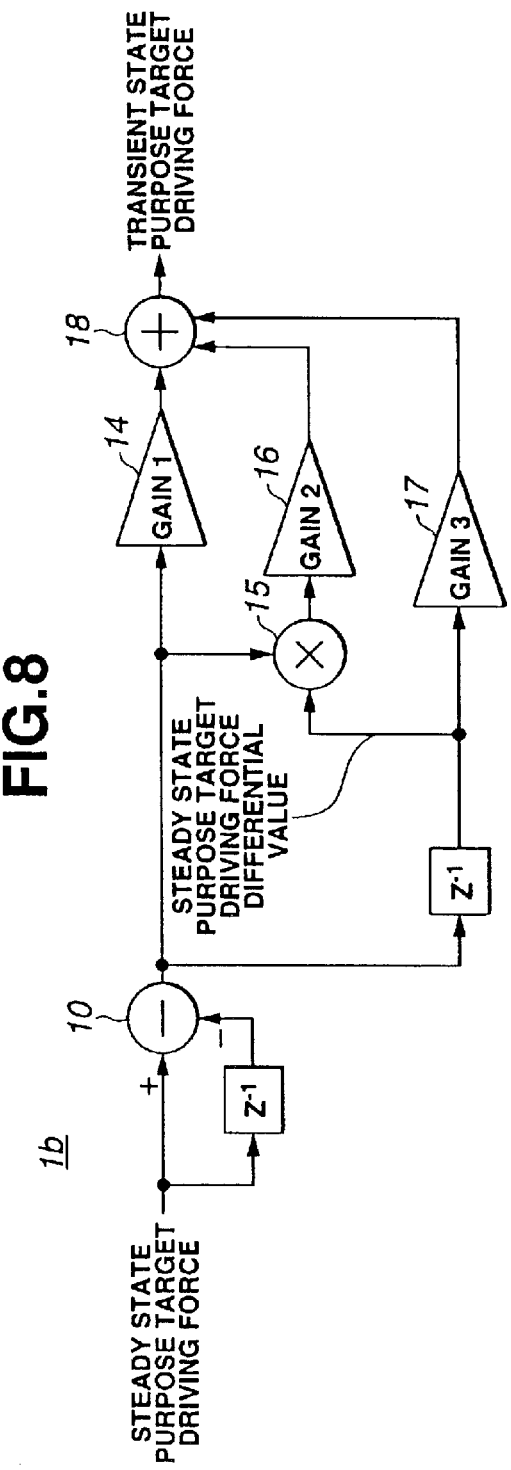
FIG. 8 is a block diagram representing the acceleration control purpose target driving force calculating section of the vehicular driving force controlling apparatus in a fourth preferred embodiment according to the present invention.

FIG. 8 shows a fourth preferred embodiment of the vehicular driving force controlling apparatus according to the present invention, Acceleration control purpose target driving force calculating section 1b in the fourth embodiment includes, as shown in FIG. 8, a differentiator 10 which calculates the steady state purpose target driving force differential value on the basis of the steady state purpose target driving force from vehicular velocity control purpose target driving force calculating section 1a; a gain 1 setter 14 which sets a gain 1 on the basis of the steady state purpose target driving force differential value; a multiplier 15 which multiplies the present differential value and the previous differential value; a gain 2 setter 16 which sets a gain 2 corresponding to the multiplied value; a gain 3 setter 17 which sets a gain 3 corresponding to the previous differential value; and an adder 18 which calculates the transient state purpose target driving force according to a non-linear characteristic equation using the gains, 1, 2, and 3. Acceleration control purpose target driving force calculating section 1b, in the fourth embodiment, the following advantage can be obtained in addition to the advantage described in item (1) of the third embodiment.

(9) Acceleration control purpose target driving force calculating section 1b, in the fourth embodiment, derives the differential value of the steady state purpose target driving force from the vehicular velocity control purpose target driving force calculating section 1a, sets gain 1 corresponding to the present differential value, gain 2 corresponding to the multiplied value between the present differential value and the previous differential value and gain 3 corresponding to the previous differential value, and calculates the transient state purpose target driving force in accordance with the non-linear characteristic equation using these gains. Hence, the driver's strong acceleration will can be reflected on the target driving force so as to obtain the larger transient state purpose target driving force as the accelerator depression velocity becomes faster in accordance with the non-linear characteristic using three gains related to the steady state purpose target driving force difference value.

(Fifth Embodiment)

Figure 9:
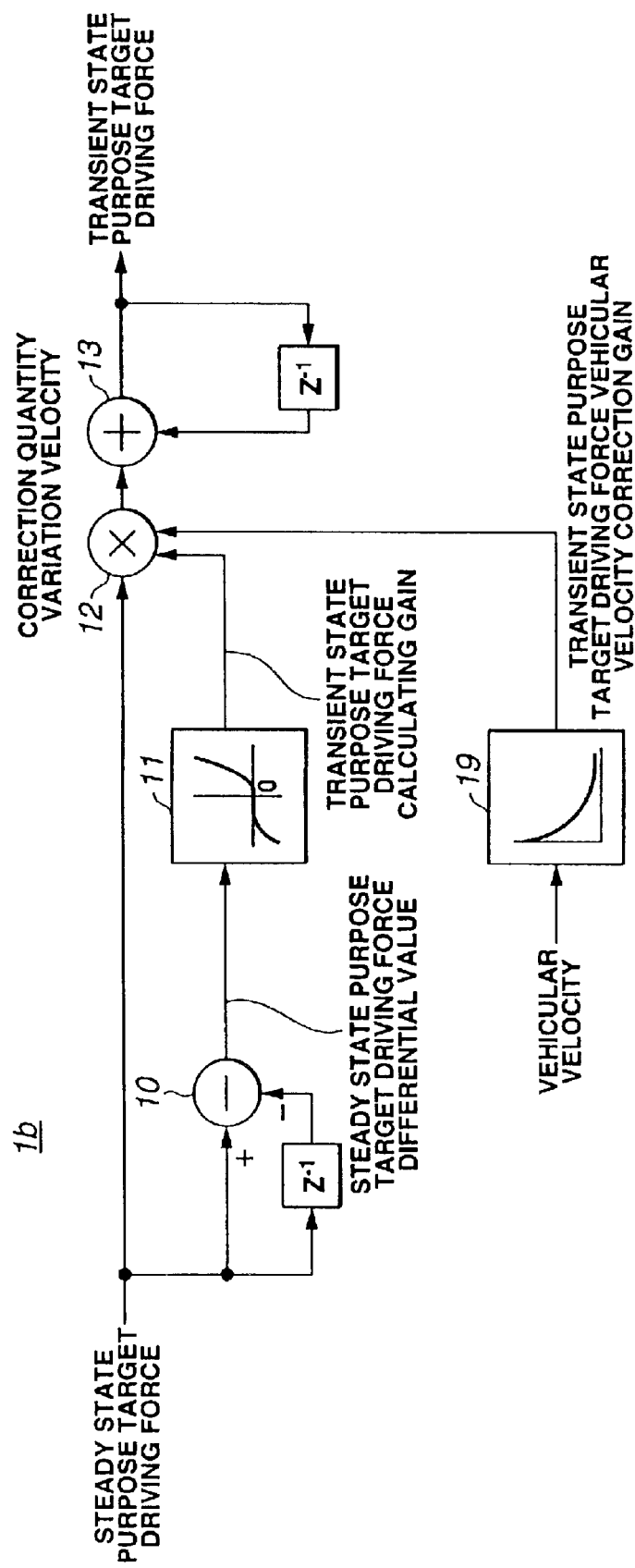
FIG. 9 is a block diagram representing an acceleration control purpose target driving force calculating section of the vehicular driving force controlling apparatus in a fifth preferred embodiment according to the present invention.

FIG. 9 shows a fifth preferred embodiment of the vehicular driving force controlling apparatus. In a fifth preferred embodiment, acceleration control purpose target driving force calculating section 1b is described. Acceleration control purpose target driving force calculating section 1b, in the fifth embodiment, includes, as shown in FIG. 9, a differentiator 10 which calculates the steady state purpose target driving force differential value on the basis of the steady state purpose target driving force from vehicular velocity purpose target driving force calculating section 1a; a gain setter 11 which sets the transient state purpose calculating gain on the basis of the steady state purpose target driving force differential value; a vehicular velocity gain setter 19 which sets a transient state target driving force vehicular velocity correction gain in accordance with the vehicular velocity; a multiplexer 12 which multiplies steady state purpose target driving force, transient state purpose target driving force calculating gain, and transient state purpose target driving force vehicular velocity correction gain to derive the correction quantity variation velocity; and an adder 13 to add or subtract the correction quantity per calculation period by means of a correction quantity variation velocity to or from the previous transient state purpose target driving force to calculate the present transient state purpose target driving force. Gain setter 11 is set in accordance with the non-linear characteristic including the dead zone in the same manner as the first embodiment. It is noted that gain setter 11 sets the gain according to the non-linear characteristic including the dead zone in the same manner as the first embodiment. It is noted that gain setter 11 sets the gain according to the non-linear character5istic including the dead zone in the same manner as the third embodiment. The vehicular velocity correction gain setter 19 sets a gain such that as the vehicular velocity becomes higher, the value of the gain becomes small, with the largest value taken at the vehicle stop.

The following advantage can be obtained, in addition to the advantage of (1) described in the third embodiment, by acceleration control purpose target driving force calculating section 1b of the fifth embodiment.

(10) Acceleration control purpose target driving force calculating section 1b derives the differential value of the steady state purpose target driving force from vehicular velocity control purpose target driving force calculating section 1a, sets the transient state purpose target driving force calculating gain corresponding to the differential value, sets the transient state purpose target driving force vehicular velocity correction gain in accordance with the vehicular velocity, calculates the correction quantity variation velocity in accordance with both of the transient state purpose target driving force calculating gain and the transient state purpose target driving force vehicular velocity correcting gain and the steady state purpose target driving force, adds the correction quantity per calculation period by means of the correction quantity variation velocity to the previous transient state purpose target driving force to calculate the present transient state purpose target driving force. Hence, the transient state purpose target driving force on which the driver's acceleration will is reflected can be obtained. Since the transient state purpose correction quantity can be reduced as the acceleration is carried out at a higher vehicular velocity, an appropriate transient state target driving force in accordance with the vehicular velocity when the acceleration is started irrespective of the situation such as the vehicular start or overturn against another vehicle.

(Sixth Embodiment)

Figure 10:
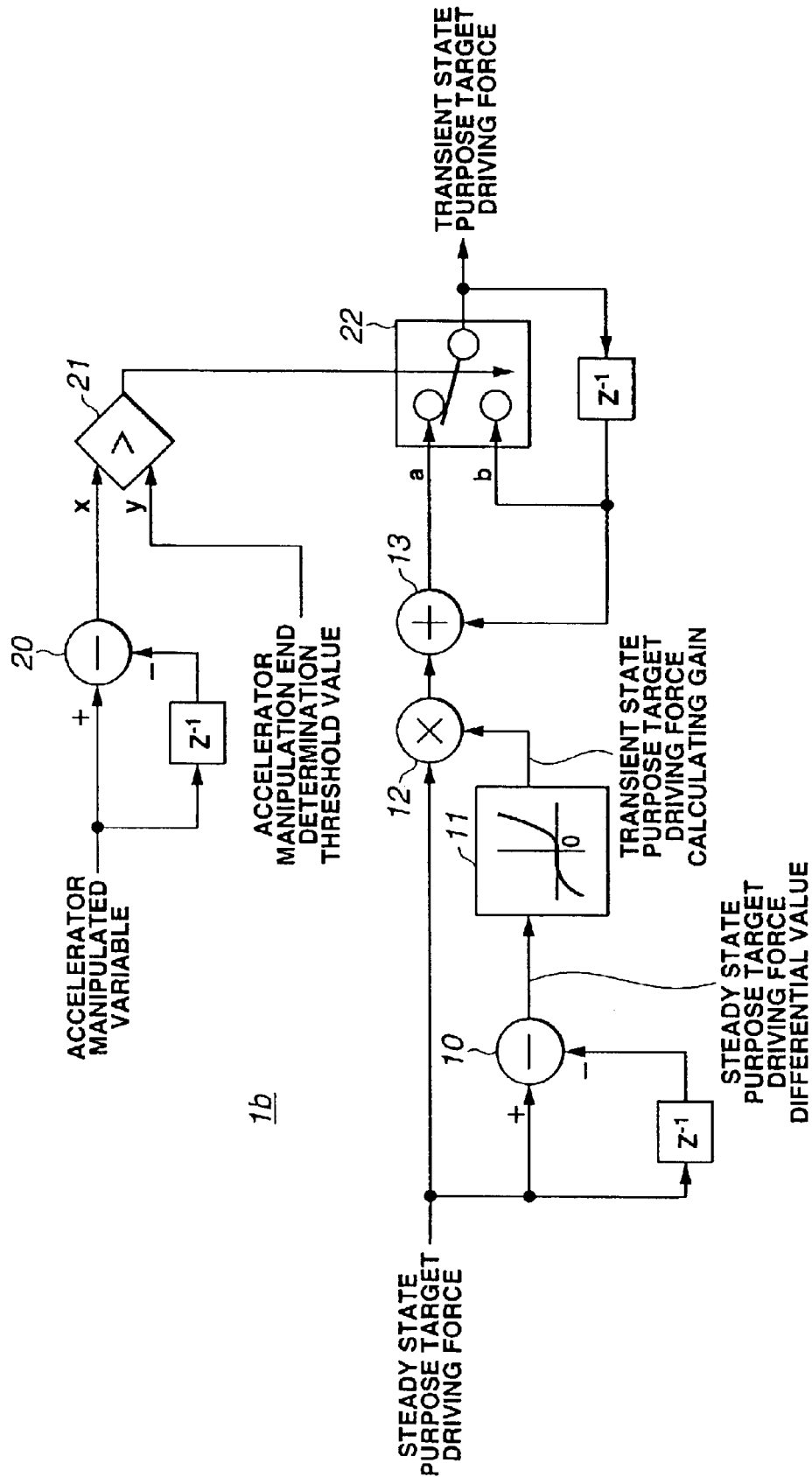
FIG. 10 is a block diagram representing an acceleration control purpose target driving force calculating section of the vehicular driving force controlling apparatus in a sixth preferred embodiment according to the present invention.

FIG. 10 shows the vehicular driving force controlling apparatus in a sixth preferred embodiment according to the present invention. Acceleration control purpose target driving force calculating section 1b basically includes differentiator 10, gain setter 11, and multiplier 12, and adder 13 in the same way as described in the third embodiment, as shown in FIG. 10. In addition to the structural elements described above, acceleration control purpose target driving force calculating section 1b includes: another differentiator 20 which calculates an accelerator manipulated variable differential value (accelerator pedal depression velocity (or manipulation velocity)); a comparator 21 which compares the calculated accelerator manipulated variable differential value with a present accelerator pedal depression end determination threshold value; and a switch 22 which switches the transient state purpose target driving force calculating path from contact a to contact b when the differential value of the accelerator manipulated variable becomes smaller than the accelerator manipulation end threshold value. That is to say, when the switch 22 is switched from contact a to contact b, the transient state purpose target driving force at a time point at which the switching from contact a to contact b is carried out is maintained as it is. Hence, the following advantage can be obtained in the sixth embodiment in addition to the advantage described in item (3) described in the third embodiment.

(11) Acceleration control purpose target driving force calculating section 1b calculates the accelerator manipulation velocity and maintains the transient state purpose target driving force at the time point at which the calculated accelerator manipulation velocity becomes smaller than the acceleration manipulation end determination threshold value. Hence, an accurate accelerator manipulation end determination technique such that the accelerator manipulation velocity is monitored permits the transient state purpose target driving force at a time point at which the accelerator depression manipulation end is determined to be ended after the accelerator depression manipulation is ended to be maintained.

(Seventh Embodiment)

Figure 11:
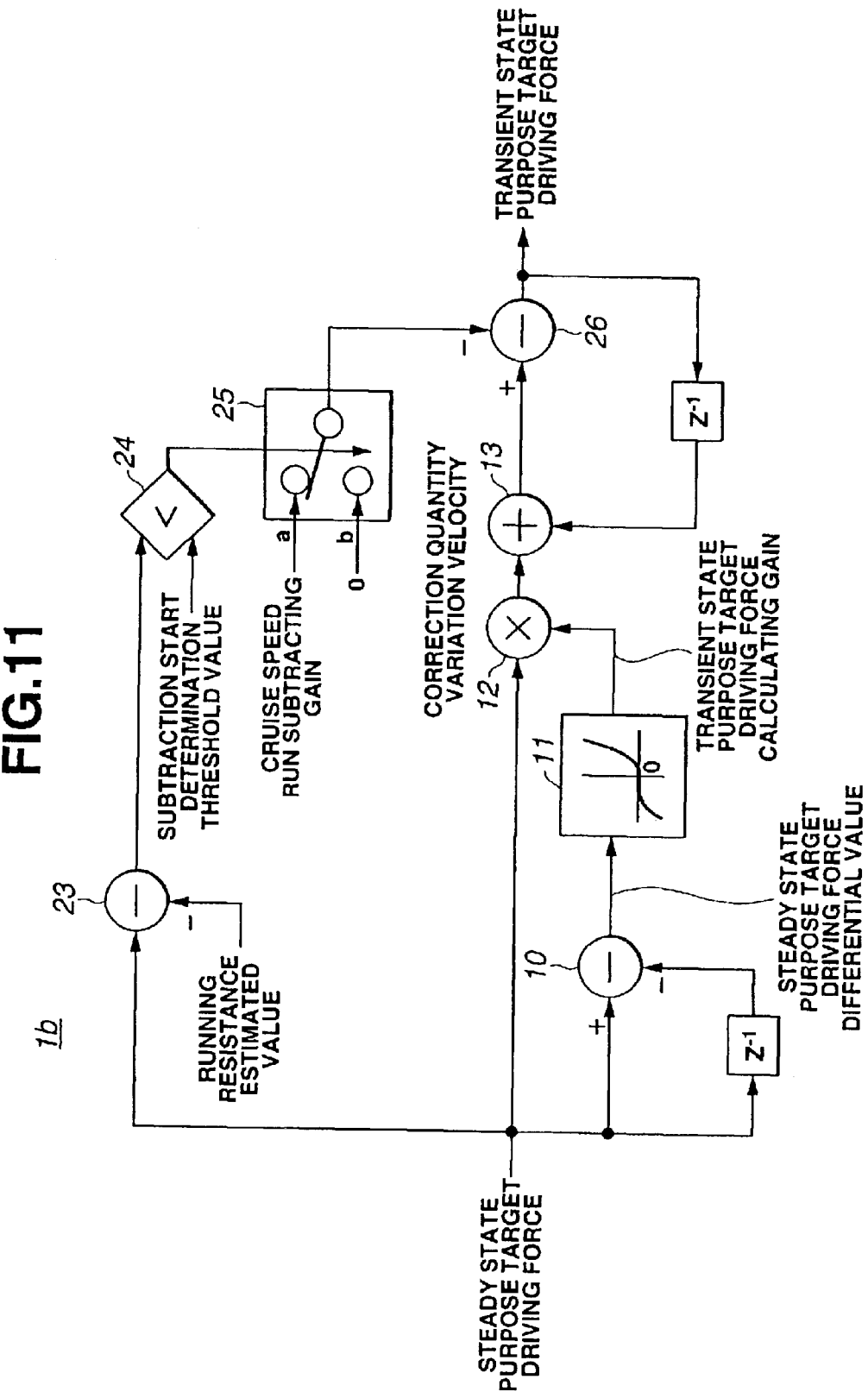
FIG. 11 is a block diagram representing an acceleration control purpose target driving force calculating section of the vehicular driving force controlling apparatus in a seventh preferred embodiment according to the present invention.

FIG. 11 shows a vehicular driving force controlling apparatus in a seventh preferred embodiment according to the present invention. In the seventh embodiment, acceleration control purpose target driving force calculating section 1b has novelty. That is to say, acceleration control purpose target driving force calculating section 1b, in the seventh embodiment, basically includes, as shown in FIG. 11, the differentiator 10, the gain setter 11, the multiplier 12, and adder 13, in the same manner as described in the third embodiment. Acceleration control purpose target driving force calculating section 1b further includes: another differentiator 23 which calculates a deviation between the steady state purpose target driving force from vehicular velocity purpose target driving force from vehicular velocity target driving force calculating section 1a and a running resistance estimated value estimated according to a road surface gradient; a comparator 24 which compares whether this deviation falls below a subtraction start threshold value; a switch 25 which switches from contact b of gain 0 side to contact a of the cruise speed run subtracting gain side when the deviation described above is below a subtraction start threshold value; and a subtractor 26 which subtracts the present transient state purpose target driving force according to the switched gain. That is to say, when switch 26 is switched from contact b to contact a, the transient state purpose target driving force is subtracted according to the cruise speed run subtracting gain.

The following advantage can be achieved in acceleration control purpose target driving force calculating section 1b of the seventh embodiment in addition to the advantage of (5) described in the third embodiment.

(12) Acceleration control purpose target driving force calculating section 1b calculates the steady state target driving force from vehicular velocity purpose target driving force calculating section 1a, the running resistance estimated value, and the deviation. Since this deviation falls below the subtraction start threshold value, the transient state target driving force in accordance with the cruise speed run subtracting gain. Hence, the accurate acceleration demand decrease determination technique with the steady state target driving force and the running resistance estimated value compared and checked permits the transient purpose target driving force which is the acceleration control purpose target driving force and running resistance estimated value permits the subtraction of the transient sate purpose target driving force which is the acceleration control purpose target driving force in accordance with the decrease in the driver's acceleration demand.

(Eighth Embodiment)

Figure 12:
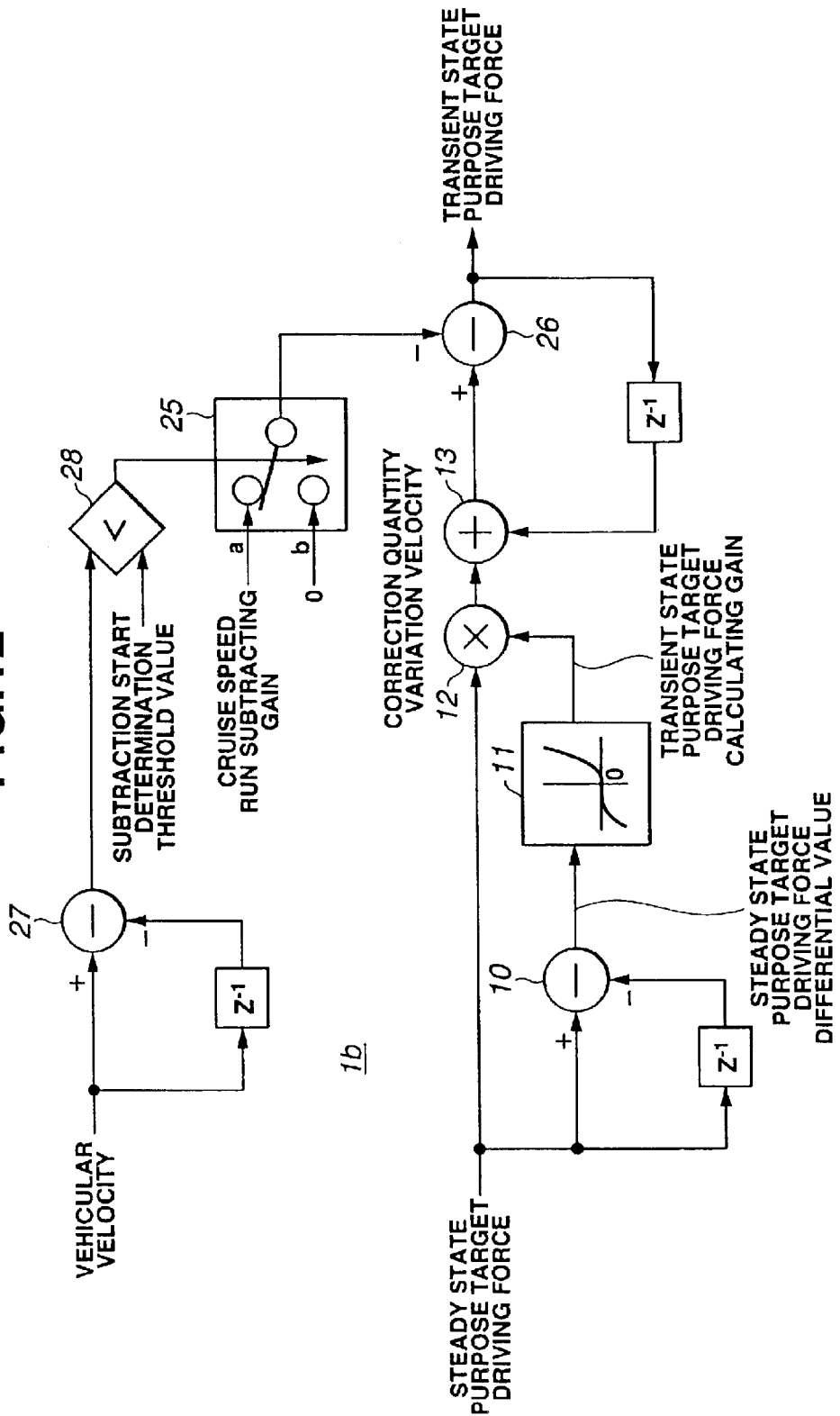
FIG. 12 is a block diagram representing an acceleration control purpose target driving force calculating section of the vehicular driving force controlling apparatus in an eighth preferred embodiment according to the present invention.

FIG. 12 shows a vehicular velocity controlling apparatus in an eighth preferred embodiment according to the present invention. In the eighth embodiment, acceleration control purpose target driving force calculating section 1b basically includes differentiator 10, gain setter 11, multiplier 12, and adder 13, as shown in FIG. 12, in the same manner as described in the third embodiment. In addition, acceleration control purpose target driving force calculating section 1b further includes another differentiator 27 which calculates a differential value (vehicular velocity variation velocity) on the basis of the vehicular velocity from vehicular velocity detecting section 3; a comparator 28 that compares whether the vehicular velocity differential value falls below the subtraction start determination threshold value; a switch 25 which switches from contact b at gain 0 side to contact a at the cruise speed run subtracting gain side; and subtractor 26 which subtracts the present transient state purpose target driving force in accordance with the cruise speed run subtracting gain. That is to say, if switch 25 is switched from contact b to contact a, the transient state purpose target driving force is subtracted in accordance with the cruise speed run subtracting gain. Hence, acceleration control purpose target driving force calculating section 1b in the eighth embodiment can obtain the following advantage in addition to the advantage of (5) described in the third preferred embodiment.

(13) Acceleration control purpose target driving force calculating section 1b in the eighth embodiment calculates the variation velocity of the vehicular velocity and subtracts the transient state purpose target driving force in accordance with the cruise speed running subtracting gain. An accurate acceleration demand determination technique such that the vehicular velocity variation rate (acceleration) is directly monitored permits the subtraction of the transient state purpose target driving force which is the acceleration control purpose target driving force in harmony with the decrease in the driver's acceleration demand.

(Ninth Embodiment)

Figure 13:
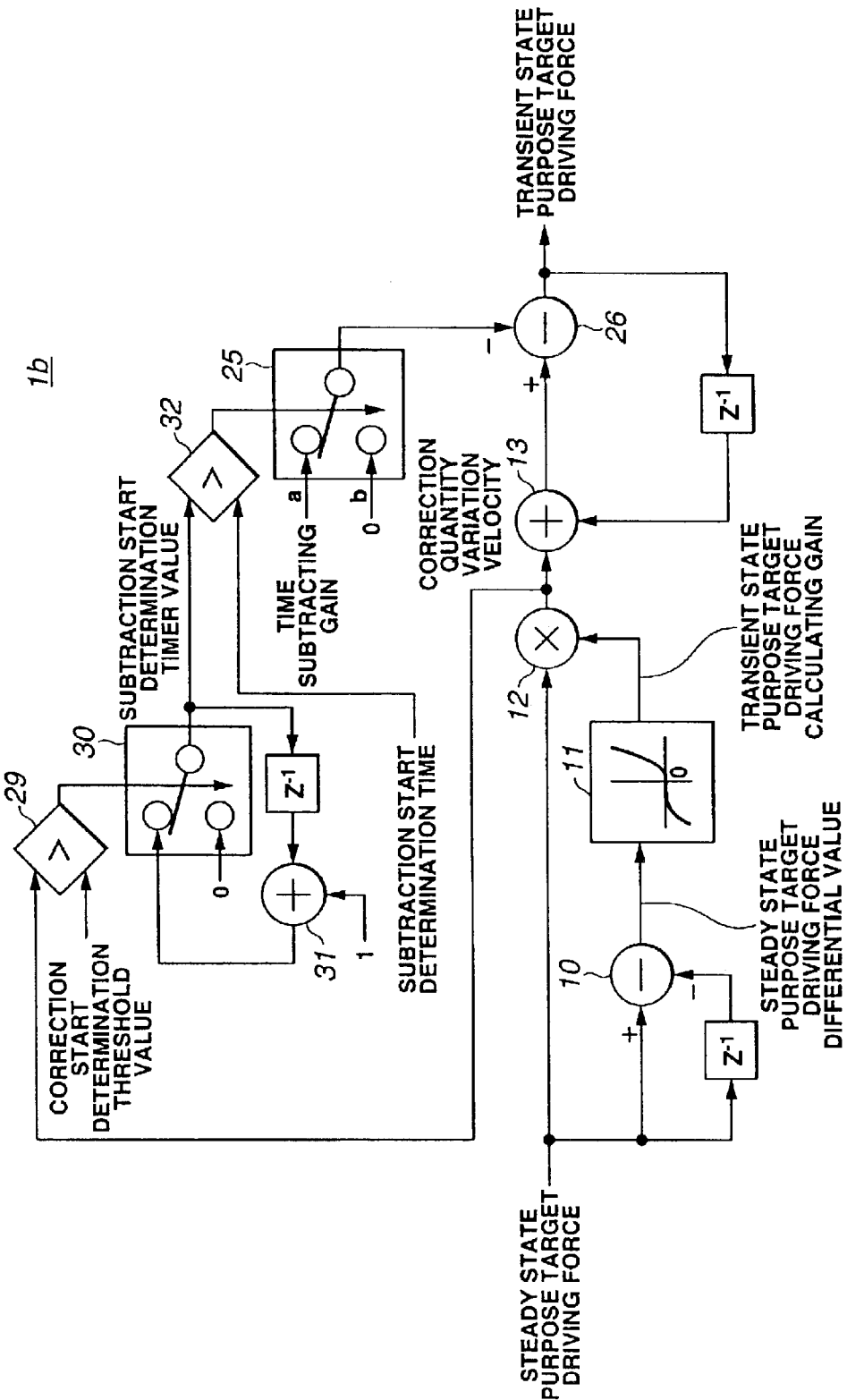
FIG. 13 is a block diagram representing an acceleration control purpose target driving force calculating section of the vehicular driving force controlling apparatus in a ninth preferred embodiment according to the present invention.

FIG. 13 shows a ninth preferred embodiment of the vehicular driving force controlling apparatus according to the present invention. In the ninth embodiment, acceleration control purpose target driving force calculating section 1b basically includes: differentiator 10; gain setter 11; multiplier 12; and adder 13. Acceleration control purpose target driving force calculating section 1b further includes: a switch 30 which switches to a decrease start determination timer at a time point at which the correction quantity variation velocity from multiplier 12 is in excess of a preset correction start determination threshold value; a timer 31 which counts up a timer value by the switch to the subtraction start determination timer side to produce a subtraction start determination timer value; a comparator 32 which compares the subtraction start determination timer with a preset subtraction start determination time so as to determine whether the subtraction start determination timer value is in excess of the preset subtraction start determination time; a switch 25 which switches from contact a at the time subtraction gain side; and a subtractor 26 which subtracts the present transient state purpose target driving force in accordance with a time subtracting gain. That is to say, when switch 25 is switched from contact b to contact a, the transient state purpose target driving force is subtracted in accordance with the time subtracting gain.

Hence, acceleration control purpose driving force calculating section 1b in the ninth embodiment can obtain the following advantage in addition to the advantage described in item (5) described in the third embodiment. That is to say, (14) Since the acceleration control purpose target driving force calculating section 1b subtracts target state corresponding target driving force in accordance with the time subtraction gain if the time has elapsed a preset time from a time point at which the correction quantity variation velocity is in excess of correction start determination threshold value, the transient state purpose target driving force is subtracted in accordance with a time subtraction gain, there is almost no variation in the transient state target driving force. Hence, the accurate determination of the acceleration demand decrease is made by a wait for the passage of a predetermined time if the decrease of the acceleration demand is estimated. Consequently, the transient state purpose target driving force which meets with the driver's acceleration demand. Thus, the transient state target driving force which is the acceleration control purpose target driving force can be subtracted in accordance with the decrease in the driver's acceleration demand.

(Tenth Embodiment)

Figure 14:
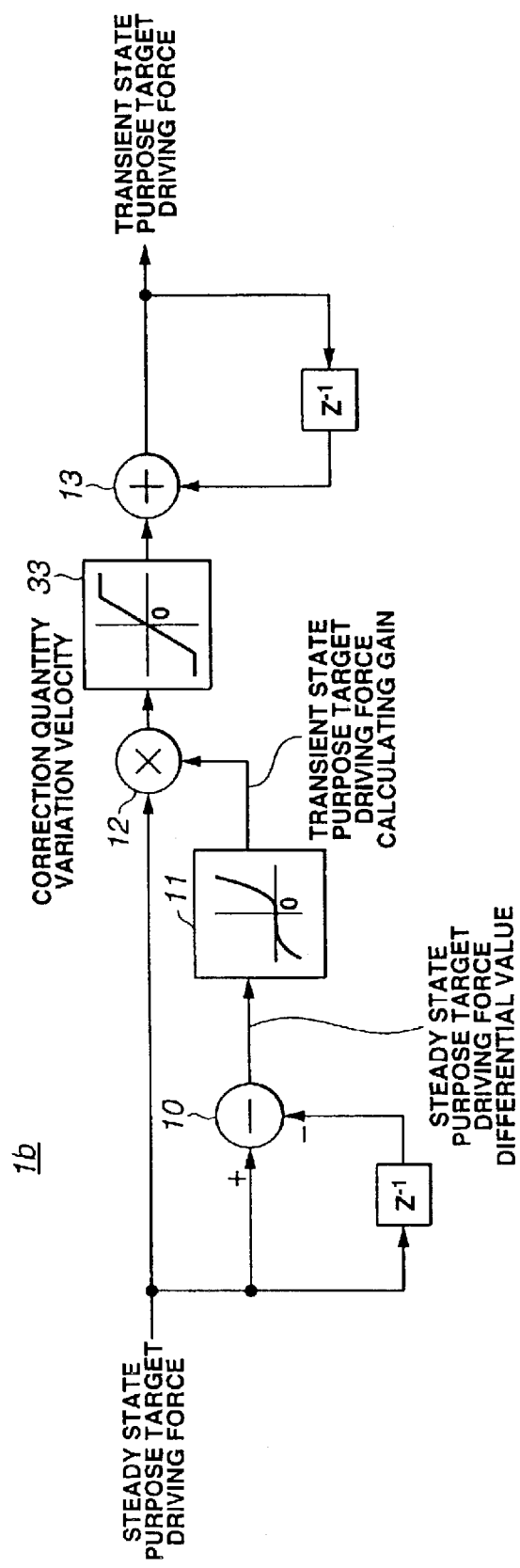
FIG. 14 is a block diagram representing an acceleration control purpose target driving force calculating section of the vehicular driving force controlling apparatus in a tenth preferred embodiment according to the present invention.

FIG. 14 shows the vehicular driving force controlling apparatus according to the present invention. In the tenth embodiment, acceleration control purpose target driving force calculating section 1b basically includes the differentiator 10, gain setter 11, multiplier 12, and adder 13 in the same way as in the third embodiment. In this addition, a limiter 33 is added to provide a limitation between multiplier 12 and adder 13. That is to say, the correction quantity variation velocity calculated by multiplier 12 is limited by limiter 33 between a maximum variation velocity and a minimum variation velocity.

Hence, acceleration control purpose target driving force calculating section 1b can have the following advantage in addition to the advantage (7) described in the third embodiment.

Acceleration control purpose target driving force calculating section 1b determines the differential value of the steady state purpose target driving force from vehicular velocity control purpose target driving force calculating section 1a, sets the transient state purpose target driving force calculating gain corresponding to the differential value, calculates the correction quantity variation velocity according to the gain and steady state target driving force by providing the limitation on the correction quantity variation velocity according to the gain and steady state purpose target driving force. Even if the abrupt accelerator depression manipulation by the driver is present, a raising velocity of the transient state purpose target driving force becomes late even if the abrupt accelerator depression manipulation (the driver depresses accelerator pedal abruptly and deeply). Hence, the acceleration control to which the transient state target driving force is added permits a timing at which the acceleration operation of the vehicle is started can be optimized.

(Eleventh Embodiment)

Figure 15:
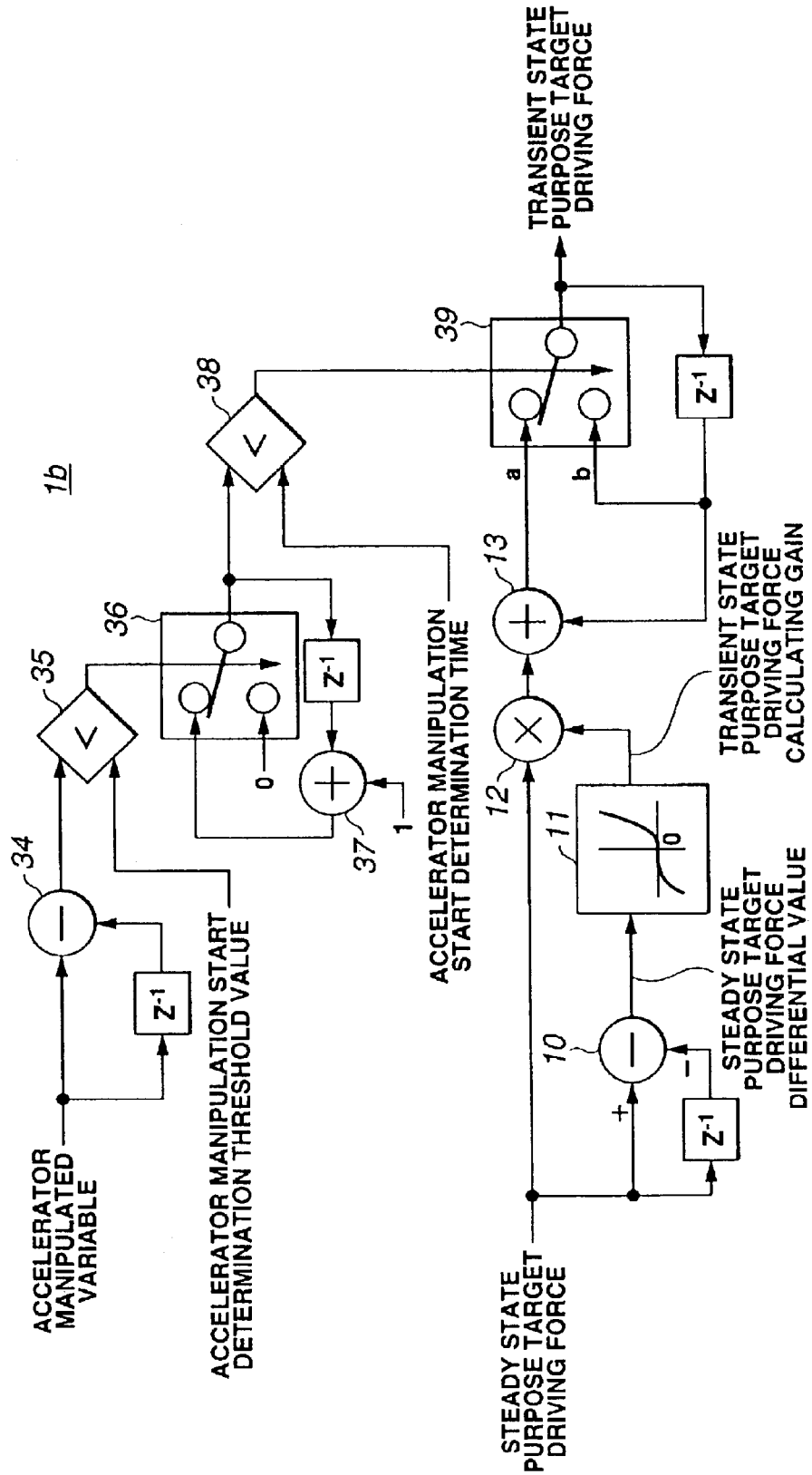
FIG. 15 is a block diagram representing an acceleration control purpose target driving force calculating section of the vehicular driving force controlling apparatus in an eleventh preferred embodiment according to the present invention.

FIG. 15 shows the vehicular driving force controlling apparatus in an eleventh preferred embodiment according to the present invention.

Acceleration control purpose target driving force calculating section 1b, in the eleventh embodiment, basically includes differentiator 10, gain setter 11, multiplier 12, and adder 13, as shown in FIG. 15, in the same manner as described in the third embodiment. In addition, acceleration control purpose target driving force calculating section 1b, as shown in FIG. 15, further includes a differentiator 34 which calculates the differential value (acceleration manipulation velocity) of the accelerator manipulated variable on the basis of the accelerator manipulated variable from accelerator manipulated variable detecting section 2; a comparator 35 which compares the calculated differential value of the accelerator manipulated variable with an accelerator manipulation start determination threshold value; a switch 36 which switches an accelerator manipulated variable start determination timer at a time point at which the accelerator manipulated variable differential value is in excess of accelerator manipulation start threshold value; a timer 37 which counts up the timer value at a time point at which the differential value of accelerator manipulated variable is in excess of the accelerator manipulation start determination threshold value; a comparator 38 which compares whether the accelerator manipulation start determination timer value is in excess of a preset accelerator manipulation start determination time; a switch 39 which switches the transient state purpose target driving force calculation path from contact b to contact a when the accelerator manipulation start timer value is in excess of the accelerator manipulation start determination time. Hence, in the acceleration control purpose target driving force calculating section 1b has the following advantage in addition to the advantage of item (7) described in the third embodiment.

(16) Acceleration control purpose target driving force calculating section 1b sets a predetermined delay time from a time point at which the accelerator manipulated variable is in excess of accelerator manipulation start determination threshold value and calculates the transient state purpose target driving force after the delay time has passed. Hence, the accurate acceleration demand is determined in such a manner that the accelerator manipulation velocity estimates the acceleration demand of the driver according to the accelerator manipulation velocity and a passage of a predetermined time is monitored after the acceleration demand is estimated. Consequently, even if a minute accelerator manipulation occurs by a driver having no acceleration will, the start of such an acceleration control that the target driving force is increased can be prevented from occurring.

(Twelfth Embodiment)

Figure 16:
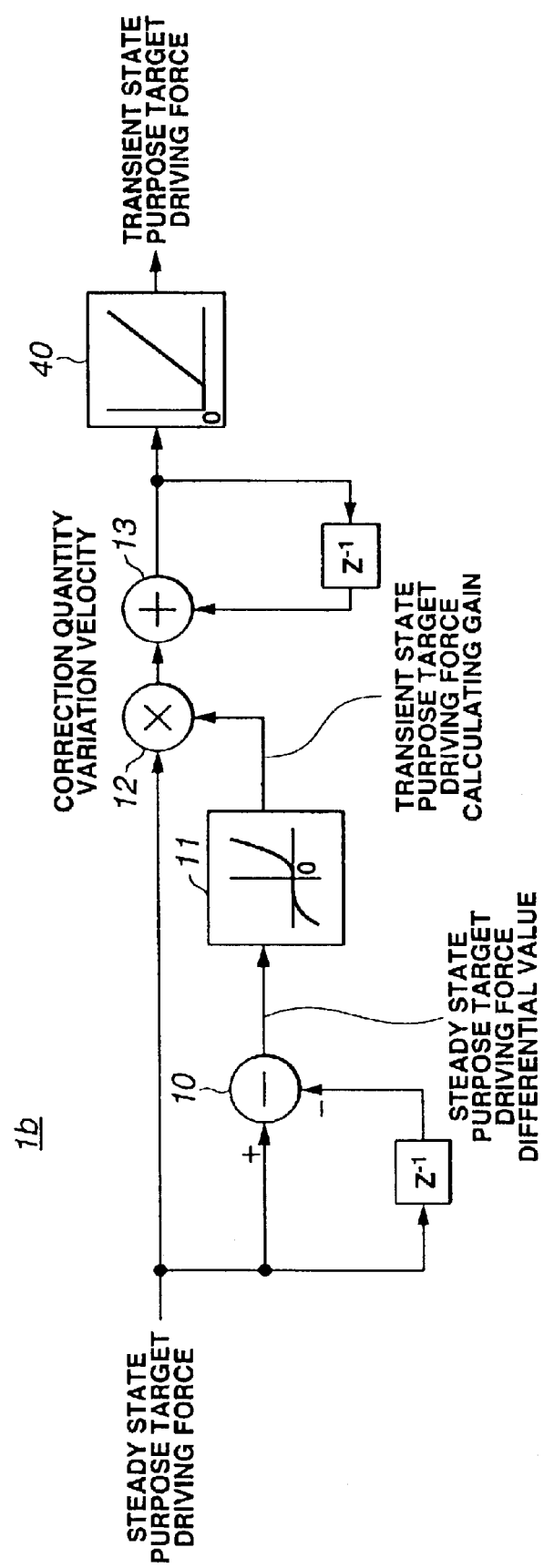
FIG. 16 is a block diagram representing an acceleration control purpose target driving force calculating section of the vehicular driving force controlling apparatus in a twelfth preferred embodiment according to the present invention.

FIG. 16 shows the vehicular driving force controlling apparatus in a twelfth preferred embodiment according to the present invention.

Acceleration control purpose target driving force calculating section 1b in the twelfth embodiment basically includes: differentiator 10; gain setter 11; multiplier 12; and adder 13, as shown in FIG. 16, in the same manner as described in the third embodiment. After the transient state purpose target driving force including the negative value is calculated subsequently to adder 13, a filter 40 to calculate the final transient state target driving force is added, with the negative value zeroed. That is to say, as the transient state purpose target driving force, a positive value equal to or larger than zero is started. Hence, acceleration control purpose corresponding target driving force calculating section 1b in the twelfth embodiment, the following advantages can be obtained.

(17) Acceleration control purpose target driving force calculating section 1b does not calculate the value equal to or below zero when the value of the transient state purpose target driving force including the negative value is calculated. Therefore, the target driving force without reducing a vehicular power performance can be calculated as the final target driving force. That is to say, the steady state purpose target driving force which is the final target driving force when the transient state purpose target driving force is zeroed is a required driving force at minimum at the accelerator manipulated variable.

(18) Since acceleration control purpose target driving force calculating section 1b calculates the final transient state purpose target driving force with the negative value zeroed after the calculation of the transient state purpose target driving force including the negative value, a simple structure in which filter 40 as shown in FIG. 16 is added to a final part of the acceleration control purpose target driving force calculating section 1b permits such a calculation section as the transient state purpose target driving force equal to or below zero to be achieved.

(Other Embodiments)

As described hereinabove, the vehicular driving force control apparatus according to the present invention has been described on the basis of the first through twelfth embodiments. However, the specific structure of the vehicular driving force control apparatus is not limited to the described embodiments. Various changes and modifications may be made without departing from the scope and sprit of the invention described in the appended claims. For example, in each of the third through twelfth embodiments, the transient state purpose target driving force is calculated with the steady state target driving force from vehicular velocity control purpose target driving force calculating section 1a as the input information. However, the accelerator manipulated variable in place of the steady state purpose target driving force may be used to constitute the acceleration control target driving force calculating section 1b shown in FIG. 1. It is noted that $Z^{-1}$ described, for example, in FIG. 7 denotes a Z transform operator having one sampling time (delay element per calculation period)

The entire contents of a Japanese Patent Application No. 2002-039456 (filed in Japan on Feb. 18, 2002) are herein incorporated by reference. The scope of the invention is defined with reference to the following claims

What is claimed is:

1. An apparatus for controlling a driving force for an automotive vehicle, comprising:

an accelerator manipulated variable detecting section that detects a manipulated variable of an accelerator;

a vehicular velocity detecting section that detects a vehicular velocity; and a target driving force calculating section that derives a vehicular target driving force in accordance with a vehicle driver's demand, the apparatus achieving the derived target driving force and the target driving force calculating section comprising:

a vehicular velocity control purpose target driving force calculating section that calculates a vehicular velocity control purpose target driving force from an absolute value of the manipulated variable of the accelerator and the vehicular velocity;

an acceleration control purpose target driving force calculating section that generates an acceleration control purpose target driving force from at least one of an absolute value of the accelerator manipulated variable and a variation speed of the manipulated variable of the accelerator; and a target driving force synthesizing section that synthesizes both of the vehicular velocity control purpose target driving force and the acceleration control purpose target driving force.

2. An apparatus for controlling a driving force for an automotive vehicle as claimed in claim 1, wherein the acceleration control purpose target driving force calculating section maintains the acceleration control purpose target driving force at a time point at which an accelerator depression manipulation is determined to be ended after the accelerator depression manipulation is ended.

3. An apparatus for controlling a driving force for an automotive vehicle as claimed in claim 1, wherein the acceleration control purpose target driving force calculating section subtracts the acceleration control purpose target driving force in accordance with a decrease in a driver's acceleration demand.

4. An apparatus for controlling a driving force for an automotive vehicle as claimed in claim 1, wherein the acceleration control purpose target driving force calculating section does not calculate the acceleration control purpose target driving force sensitive more than necessary with respect to a minute accelerator manipulation by the driver.

5. An apparatus for controlling a driving force for an automotive vehicle as claimed in claim 1, wherein the acceleration control purpose target driving force calculating section does not calculate the acceleration control purpose target driving force which is equal to zero or below zero when calculating the acceleration control purpose target driving force.

6. An apparatus for controlling a driving force for an automotive vehicle, comprising:
   an accelerator manipulated variable detecting section that detects a manipulated variable of an accelerator;
   a vehicular velocity detecting section that detects a vehicular velocity; and
   a target driving force calculating section that derives a vehicular target driving force in accordance with a vehicle driver's demand, the apparatus achieving the derived target driving force and the target driving force calculating section comprising:
      a vehicular velocity control purpose target driving force calculating section that calculates a vehicular velocity control purpose target driving force from an absolute value of the manipulated variable of the accelerator and the vehicular velocity;
      an acceleration control purpose target driving force calculating section that generates an acceleration control purpose target driving force from at least one of an absolute value of a result of calculation by the vehicular velocity control purpose target driving force calculating section and a variation speed of the result of calculation by the same; and
      a target driving force synthesizing section that synthesizes both of the vehicular velocity control purpose target driving force and the acceleration control purpose target driving force.

7. An apparatus for controlling a driving force for an automotive vehicle as claimed in claim 6, wherein the acceleration control purpose target driving force calculating section calculates the acceleration control purpose target driving force in accordance with the variation velocity of the vehicular velocity control purpose target driving force.

8. An apparatus for controlling a driving force for an automotive vehicle as claimed in claim 7, wherein the acceleration control purpose target driving force calculating section determines a differential value of a steady-state purpose target driving force from the vehicular velocity purpose target driving force calculating section, sets a transient state target driving force calculating gain corresponding to the differential value, calculates a correction quantity variation velocity according to the gain and the steady state target driving force, and adds a correction quantity per calculation period to the previous transient state target driving force to calculate the present transient state target driving force.

9. An apparatus for controlling a driving force for an automotive vehicle as claimed in claim 7, wherein the acceleration control purpose target driving force calculating section determines the differential value of the steady-state target driving force from the vehicular velocity control purpose target driving force calculating section, sets a first gain corresponding to the present differential value, sets a second gain corresponding to a multiplied value between the present differential value and the previous differential value, sets a third gain corresponding to the previous differential value, and calculates a transient state target driving force which is the acceleration control purpose target driving force according to a non-linear characteristic equation using the first, second, and third gains.

10. An apparatus for controlling a driving force for an automotive vehicle as claimed in claim 7, wherein the acceleration control purpose target driving force calculating section determines a differential value of a steady state purpose target driving force from the vehicular velocity control purpose target driving force calculating section, sets a transient state purpose target driving force calculating gain from the vehicular velocity control purpose calculating section, sets a transient state purpose target driving force calculating gain corresponding to the differential value, sets a transient state purpose target driving force vehicular velocity correcting gain according to the vehicular velocity, calculates a correction quantity variation velocity according to both of the gains and a steady state purpose target driving force, and adds a previous transient state target driving force to the correction quantity per calculation period according to the correction quantity variation velocity to calculate a present transient state target driving force.

11. An apparatus for controlling a driving force for an automotive vehicle as claimed in claim 6, wherein the acceleration control purpose target driving force calculating section maintains the acceleration control purpose target driving force at a time point at which an accelerator depression manipulation is determined to be ended after the accelerator depression manipulation is ended.

12. An apparatus for controlling a driving force for an automotive vehicle as claimed in claim 11, wherein the acceleration control purpose target driving force calculating section calculates a manipulation velocity of the accelerator and maintains the transient state purpose target driving force when the calculated accelerator manipulation velocity becomes smaller than an accelerator manipulation end determination threshold value.

13. An apparatus for controlling a driving force for an automotive vehicle as claimed in claim 11, wherein the acceleration control purpose target driving force calculating section derives a differential value of a steady state purpose target driving force from the vehicular velocity control purpose target driving force calculating section, sets a transient state purpose target driving force calculating gain to zero to maintain a previous transient state purpose target driving force at a present transient state purpose target driving force in a case where the differential value of the steady state purpose target driving force falls in a range equal to or below a preset value.

14. An apparatus for controlling a driving force for an automotive vehicle as claimed in claim 6, wherein the acceleration control purpose target driving force calculating section subtracts the acceleration control purpose target driving force in accordance with a decrease in a driver's acceleration demand.

15. An apparatus for controlling a driving force for an automotive vehicle as claimed in claim 14, wherein the acceleration control purpose target driving force calculating section calculates a differential value of a steady state purpose target driving force from the vehicular velocity purpose target driving force calculating section, sets a transient state purpose target driving force calculating gain including a negative value corresponding to the differential value, calculates a correction quantity variation velocity according to the gain and the steady state purpose target driving force, and subtracts a correction quantity per calculation period according to the correction quantity variation velocity from a previous transient state purpose target driving force to calculate a present transient state purpose target driving force.

16. An apparatus for controlling a driving force for an automotive vehicle as claimed in claim 14, wherein the acceleration control purpose target driving force calculating section calculates a deviation between a steady state purpose target driving force from the vehicular velocity purpose target driving force calculating section and a running resistance estimated value and subtracts the transient state purpose target driving force in accordance with a cruise speed control subtracting gain if the deviation is below a subtraction start threshold value.

17. An apparatus for controlling a driving force for an automotive vehicle as claimed in claim 14, wherein the acceleration control purpose target driving force calculating section calculates a variation rate of the vehicular velocity and subtracts the transient state purpose target driving force in accordance with a cruise speed running subtracting gain if the vehicular velocity variation rate is below a subtraction start threshold value.

18. An apparatus for controlling a driving force for an automotive vehicle as claimed in claim 14, wherein the acceleration control purpose target driving force calculating section subtracts the transient state purpose target driving force in accordance with a time subtracting gain when the correction quantity variation velocity is in excess of a correction start determination threshold value and a preset time has elapsed from a time point at which the calculation of the transient state purpose target driving force is started.

19. An apparatus for controlling a driving force for an automotive vehicle as claimed in claim 6, wherein the acceleration control purpose target driving force calculating section does not calculate the acceleration control purpose target driving force sensitive more than necessary with respect to a minute accelerator manipulation by the driver.

20. An apparatus for controlling a driving force for an automotive vehicle as claimed in claim 19, wherein the acceleration control purpose target driving force calculating section derives the differential value of the steady state purpose target driving force from the vehicular velocity control purpose target driving force calculating section and does not calculate the transient state purpose target driving force when the steady state purpose target driving force falls within a dead zone which is a range of the differential value equal to or below a preset value.

21. An apparatus for controlling a driving force for an automotive vehicle as claimed in claim 19, wherein the acceleration control purpose target driving force calculating section derives the differential value of the steady state purpose target driving force from the vehicular velocity control purpose target driving force calculating section, sets a transient state purpose target driving force calculating gain corresponding to the differential value, calculates a correction quantity variation velocity according to the differential value and the steady state purpose target driving force, and provides a limit for the correction quantity variation velocity to calculate a transient state purpose target driving force.

22. An apparatus for controlling a driving force for an automotive vehicle as claimed in claim 19, wherein the acceleration control purpose target driving force calculating section sets a predetermined delay time from a time at which the accelerator manipulated variable is in excess of an accelerator manipulation start determination threshold value and calculates the transient state purpose target driving force after the predetermined delay time is elapsed.

23. An apparatus for controlling a driving force for an automotive vehicle as claimed in claim 6, wherein the acceleration control purpose target driving force calculating section does not calculate the acceleration control purpose target driving force which is equal to zero or below zero when calculating the acceleration control purpose target driving force.

24. An apparatus for controlling a driving force for an automotive vehicle as claimed in claim 23, wherein the acceleration control purpose target driving force calculating section calculates the transient state purpose target driving force including the negative value, and zeroes the negative value thereof to finally calculate a final transient state purpose target driving force.

25. An apparatus for controlling a driving force for an automotive vehicle as claimed in claim 6, wherein the apparatus is applied to an engine output control system.

26. An apparatus for controlling a driving force for an automotive vehicle as claimed in claim 6, wherein the apparatus is applied to a vehicular traction control system.

27. An apparatus for controlling a driving force for an automotive vehicle as claimed in claim 1, wherein the acceleration control purpose target driving force calculating section calculates the acceleration control purpose target driving force in accordance with the variation velocity of the manipulated variable of the accelerator.

28. A method for controlling a driving force for an automotive vehicle, the method comprising:
    detecting a manipulated variable of an accelerator;
    detecting a vehicular velocity; and
    deriving a vehicular target driving force in accordance with a vehicle driver's demand, the method achieving the derived target driving force and driving the vehicular target driving force comprising:
        calculating a vehicular velocity control purpose target driving force from an absolute value of the manipulated variable of the accelerator and the vehicular velocity;
        generating an acceleration control purpose target driving force from at least one of an absolute value of the accelerator manipulated variable and a variation velocity of the manipulated variable of the accelerator; and
        synthesizing both of the vehicular velocity control purpose target driving force and the acceleration control purpose target driving force to achieve a target driving force of the vehicle.

29. A method for controlling a driving force for an automotive vehicle, the method comprising:
    detecting a manipulated variable of an accelerator;
    detecting a vehicular velocity; and
    deriving a vehicular target driving force in accordance with a vehicle driver's demand, the method achieving the derived target driving force and deriving the target driving force comprising:
        calculating a vehicular velocity control purpose target driving force from an absolute value of the manipulated variable of the accelerator and the vehicular velocity;
        generating an acceleration control purpose target driving force from at least one of an absolute value of a result of calculation of the vehicular velocity control purpose target driving force and a variation velocity of the result of calculation of the same; and
        synthesizing both of the vehicular velocity control purpose target driving force and the acceleration control purpose target driving force.

30. An apparatus for controlling a driving force for an automotive vehicle, comprising:
    accelerator manipulated variable detecting means for detecting a manipulated variable of an accelerator;
    vehicular velocity detecting means for detecting a vehicular velocity; and target driving force calculating section for deriving a vehicular target driving force in accordance with a vehicle driver's demand, the apparatus achieving the derived target driving force and the target driving force calculating means comprising:
- vehicular velocity control purpose target driving force calculating means for calculating a vehicular velocity control purpose target driving force from an absolute value of the manipulated variable of the accelerator and the vehicular velocity;
- acceleration control purpose target driving force calculating means for generating an acceleration control purpose target driving force from at least one of an absolute value of the accelerator manipulated variable and a variation velocity of the manipulated variable of the accelerator; and
- target driving force synthesizing means for synthesizing both of the vehicular velocity control purpose target driving force and the acceleration control purpose target driving force.

31. An apparatus for controlling a driving force for an automotive vehicle, comprising:
- accelerator manipulated variable detecting means for detecting a manipulated variable of an accelerator;
- vehicular velocity detecting means for detecting a vehicular velocity; and
- target driving force calculating section for deriving a vehicular target driving force in accordance with a vehicle driver's demand, the apparatus achieving the derived target driving force and the target driving force calculating means comprising:
  - vehicular velocity control purpose target driving force calculating means for calculating a vehicular velocity control purpose target driving force from an absolute value of the manipulated variable of the accelerator and the vehicular velocity;
  - acceleration control purpose target driving force calculating means for generating an acceleration control purpose target driving force from at least one of an absolute value of a result of calculation by the vehicular velocity control purpose target driving force calculating means and a variation velocity of the result of calculation by the same; and
  - target driving force synthesizing means for synthesizing both of the vehicular velocity control purpose target driving force and the acceleration control purpose target driving force.

* * * * *